United States Patent
Thomassin et al.

(10) Patent No.: US 12,240,619 B2
(45) Date of Patent: Mar. 4, 2025

(54) TORQUE BALANCING FOR HYBRID ELECTRIC PROPULSION SYSTEMS AND AIRCRAFT UTILIZING HYBRID ELECTRIC PROPULSION SYSTEMS

(71) Applicant: PRATT & WHITNEY CANADA CORP., Longueuil (CA)

(72) Inventors: Jean Thomassin, Ste Julie (CA); Sorin Bengea, Glastonbury, CT (US); Tatjana Pekovic, Saint Lambert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 621 days.

(21) Appl. No.: 16/706,449

(22) Filed: Dec. 6, 2019

(65) Prior Publication Data

US 2020/0277073 A1 Sep. 3, 2020

Related U.S. Application Data

(60) Provisional application No. 62/812,657, filed on Mar. 1, 2019.

(51) Int. Cl.
*B64D 31/12* (2006.01)
*B60W 10/04* (2006.01)
(Continued)

(52) U.S. Cl.
CPC ............. *B64D 31/12* (2013.01); *B60W 10/04* (2013.01); *B64D 27/02* (2013.01); *B64D 27/10* (2013.01);
(Continued)

(58) Field of Classification Search
CPC ........ B64D 27/02; B64D 27/10; B64D 27/24; B64D 31/12; B64D 31/2027;
(Continued)

(56) References Cited

U.S. PATENT DOCUMENTS 4,204,401 A * 5/1980 Earnest .................... F02C 3/34
60/773
6,179,072 B1 1/2001 Hou
(Continued)

FOREIGN PATENT DOCUMENTS

BR MU8701724 U2 6/2009
BR PI0702882 A2 3/2011
(Continued)

OTHER PUBLICATIONS

PCT International Search Report and Written Opinion dated Apr. 2, 2020, issued during the prosecution of PCT International Application No. PCT/US2019/065060.

*Primary Examiner* — Loren C Edwards
(74) *Attorney, Agent, or Firm* — NORTON ROSE FULBRIGHT CANADA LLP

(57) ABSTRACT

A hybrid electric engine control module (ECU) configured to be operatively connected to a hybrid electric aircraft powerplant having a heat engine system and an electric motor system to control a torque output from each of the heat engine system and the electric motor system. The ECU can be configured to receive a torque command and split output power between the electric motor system and the heat engine system. Additionally and/or alternatively, the ECU can be configured to balance a total torque against a second total torque of a second aircraft powerplant.

19 Claims, 4 Drawing Sheets

(51) Int. Cl.
   *B64D 27/02* (2006.01)
   *B64D 27/10* (2006.01)
   *B64D 27/24* (2006.01)
   *F02C 7/22* (2006.01)
   *F02C 9/26* (2006.01)
   *F02C 9/42* (2006.01)

(52) U.S. Cl.
   CPC ............... *B64D 27/24* (2013.01); *F02C 7/22* (2013.01); *F02C 9/26* (2013.01); *F02C 9/42* (2013.01); *B64D 27/026* (2024.01)

(58) Field of Classification Search
   CPC ..... B64D 31/026; B60W 10/04; B60W 20/00; B60W 20/10; B60W 20/40; G05D 1/0061; G05D 1/0088; G05D 1/021; G05D 1/0214; G05D 1/0021; G05D 1/0223; F02C 7/22; F02C 9/26; F02C 9/42
   See application file for complete search history.

(56) References Cited

U.S. PATENT DOCUMENTS

| | | |
|---|---|---|
| 6,198,183 B1 | 3/2001 | Baeumel et al. |
| 6,335,581 B1 | 1/2002 | Warnke |
| 6,427,441 B2 | 8/2002 | Wustefeld et al. |
| 6,537,047 B2 | 3/2003 | Walker |
| 6,692,395 B2 | 2/2004 | Rodeghiero et al. |
| 7,022,042 B2 | 4/2006 | Fleytman |
| 7,098,569 B2 | 8/2006 | Ong et al. |
| 7,247,967 B2 | 7/2007 | Ionel et al. |
| 7,303,497 B1 | 12/2007 | Wige |
| 7,316,629 B2 | 1/2008 | Nakagawa et al. |
| 7,345,398 B2 | 3/2008 | Purvines et al. |
| 7,398,946 B1 | 7/2008 | Marshall |
| 7,418,820 B2 | 9/2008 | Harvey et al. |
| 7,471,026 B2 | 12/2008 | Bender |
| 7,503,173 B2 | 3/2009 | Dong et al. |
| 7,726,426 B2 | 6/2010 | Beck et al. |
| 7,827,787 B2 | 11/2010 | Cherney et al. |
| 7,867,122 B2 | 1/2011 | Jones |
| 7,958,725 B2 | 6/2011 | Elliott |
| 8,217,544 B2 | 7/2012 | Osada et al. |
| 8,342,995 B2 | 1/2013 | Grant |
| 8,382,635 B2 | 2/2013 | Tampieri |
| 8,435,156 B2 | 5/2013 | Christ |
| 8,446,121 B1 | 5/2013 | Parsa et al. |
| 8,471,429 B2 | 6/2013 | Kaiser et al. |
| 8,495,870 B2 | 7/2013 | Sumiyoshi et al. |
| 8,531,076 B2 | 9/2013 | Stabenow et al. |
| 8,535,197 B2 | 9/2013 | Scekic |
| 8,584,452 B2 | 11/2013 | Lloyd |
| 8,596,054 B2 | 12/2013 | Law et al. |
| 8,621,860 B2 | 1/2014 | Hennemann et al. |
| 8,622,859 B2 | 1/2014 | Babbitt et al. |
| 8,660,761 B2 | 2/2014 | Anderson et al. |
| 8,663,047 B2 | 3/2014 | Schroth et al. |
| 8,710,786 B1 | 4/2014 | Parsa et al. |
| 8,747,267 B2 | 6/2014 | Sutherland |
| 8,915,812 B2 | 12/2014 | Haglsperger et al. |
| 8,943,820 B2 | 2/2015 | Carlton et al. |
| 8,967,532 B2 | 3/2015 | Vialle |
| 9,039,566 B2 | 5/2015 | Rudy |
| 9,051,996 B2 | 6/2015 | During et al. |
| 9,096,230 B2 | 8/2015 | Ries et al. |
| 9,102,223 B2 | 8/2015 | Greenwood |
| 9,109,682 B2 | 8/2015 | Lee et al. |
| 9,206,885 B2 | 12/2015 | Rekow et al. |
| 9,212,625 B2 | 12/2015 | Shelley |
| 9,261,182 B2 | 2/2016 | Kato et al. |
| 9,303,727 B2 | 4/2016 | Reimann et al. |
| 9,343,939 B2 | 5/2016 | Schutten et al. |
| 9,401,631 B2 | 7/2016 | Wu et al. |
| 9,447,858 B2 | 9/2016 | Weeramantry et al. |
| 9,458,864 B2 | 10/2016 | Hyon et al. |
| 9,546,468 B2 | 1/2017 | Bang |
| 9,551,400 B2 | 1/2017 | Hiasa et al. |
| 9,683,585 B2 | 6/2017 | Akiyama et al. |
| 9,735,638 B2 | 8/2017 | Herz et al. |
| 9,963,855 B2 | 5/2018 | Jagoda |
| 9,976,437 B2 | 5/2018 | McCune et al. |
| 10,000,275 B2 | 6/2018 | Tendola et al. |
| 10,024,341 B2 | 7/2018 | Zhang et al. |
| 10,086,946 B1 | 10/2018 | Zywiak et al. |
| 10,122,227 B1 | 11/2018 | Long |
| 10,183,744 B2 | 1/2019 | Gamble |
| 10,287,917 B2 | 5/2019 | Schwarz et al. |
| 10,374,477 B2 | 8/2019 | Niergarth et al. |
| 2005/0178893 A1 | 8/2005 | Miller et al. |
| 2005/0258306 A1 | 11/2005 | Barocela et al. |
| 2006/0016196 A1 | 1/2006 | Epstein |
| 2006/0016197 A1 | 1/2006 | Epstein |
| 2006/0056971 A1 | 3/2006 | D'Anna |
| 2006/0237583 A1 | 10/2006 | Fucke et al. |
| 2007/0170307 A1 | 7/2007 | de la Cierva Hoces |
| 2007/0264124 A1 | 11/2007 | Mueller et al. |
| 2008/0141921 A1 | 6/2008 | Hinderks |
| 2008/0145221 A1 | 6/2008 | Sun et al. |
| 2008/0275597 A1* | 11/2008 | Gaulmin ................... F02C 9/28 701/100 |
| 2009/0050103 A1 | 2/2009 | Heaton |
| 2009/0229897 A1 | 9/2009 | Yutani et al. |
| 2010/0264724 A1 | 10/2010 | Nelson et al. |
| 2010/0285747 A1 | 11/2010 | Bauer et al. |
| 2011/0215584 A1 | 9/2011 | Prokopich |
| 2011/0236218 A1 | 9/2011 | Russ et al. |
| 2011/0243566 A1 | 10/2011 | Truong |
| 2011/0256973 A1 | 10/2011 | Werner et al. |
| 2011/0266995 A1 | 11/2011 | Winfield et al. |
| 2012/0025032 A1 | 2/2012 | Hopdjanian et al. |
| 2012/0137684 A1 | 6/2012 | Yogev et al. |
| 2012/0168557 A1 | 7/2012 | Edelson et al. |
| 2012/0227389 A1 | 9/2012 | Hinderks |
| 2012/0239228 A1 | 9/2012 | Vos |
| 2012/0327921 A1 | 12/2012 | Schirrmacher et al. |
| 2013/0026304 A1 | 1/2013 | Wang |
| 2013/0082135 A1 | 4/2013 | Moret |
| 2013/0119841 A1 | 5/2013 | Graf et al. |
| 2013/0168489 A1 | 7/2013 | McIntee |
| 2013/0181088 A1 | 7/2013 | Casado Montero et al. |
| 2013/0227950 A1 | 9/2013 | Anderson et al. |
| 2013/0287574 A1 | 10/2013 | Ebbesen et al. |
| 2013/0300120 A1 | 11/2013 | Podrog |
| 2013/0341934 A1 | 12/2013 | Kawanishi |
| 2014/0010652 A1 | 1/2014 | Suntharalingam et al. |
| 2014/0027568 A1 | 1/2014 | Fleddermann et al. |
| 2014/0054411 A1 | 2/2014 | Connaulte et al. |
| 2014/0117148 A1 | 5/2014 | Dyrla et al. |
| 2014/0203739 A1 | 7/2014 | Chantriaux et al. |
| 2014/0248168 A1 | 9/2014 | Chantriaux et al. |
| 2014/0283519 A1 | 9/2014 | Mariotto et al. |
| 2014/0318132 A1 | 10/2014 | Podrog |
| 2015/0028594 A1 | 1/2015 | Mariotto |
| 2015/0076949 A1 | 3/2015 | Alim |
| 2015/0083852 A1 | 3/2015 | Moser et al. |
| 2015/0151844 A1 | 6/2015 | Anton et al. |
| 2015/0274306 A1 | 10/2015 | Sheridan |
| 2015/0311755 A1 | 10/2015 | Hiebl et al. |
| 2016/0010589 A1 | 1/2016 | Rolt |
| 2016/0016670 A1 | 1/2016 | Sautreuil et al. |
| 2016/0076446 A1 | 3/2016 | Bailey Noval et al. |
| 2016/0218930 A1 | 7/2016 | Toillon et al. |
| 2016/0305470 A1 | 10/2016 | Remer et al. |
| 2017/0016398 A1 | 1/2017 | Thiriet et al. |
| 2017/0016399 A1 | 1/2017 | Bedrine et al. |
| 2017/0072755 A1 | 3/2017 | Zhou et al. |
| 2017/0096233 A1 | 4/2017 | Mercier-Calvairac et al. |
| 2017/0152055 A1 | 6/2017 | Mercier-Calvairac et al. |
| 2017/0159574 A1 | 6/2017 | Paul et al. |
| 2017/0203839 A1 | 7/2017 | Giannini et al. |
| 2017/0240273 A1 | 8/2017 | Yuen |
| 2017/0241347 A1 | 8/2017 | Marconi et al. |
| 2017/0284408 A1 | 10/2017 | Ricordeau et al. |

(56) References Cited

U.S. PATENT DOCUMENTS

| | | |
|---|---|---|
| 2017/0305541 A1 | 10/2017 | Vallart et al. |
| 2017/0327241 A1* | 11/2017 | Mitrovic .................. F02C 7/262 |
| 2017/0328282 A1 | 11/2017 | Jensen et al. |
| 2017/0370344 A1 | 12/2017 | Kassianoff |
| 2018/0002025 A1 | 1/2018 | Lents et al. |
| 2018/0003071 A1 | 1/2018 | Lents et al. |
| 2018/0003072 A1 | 1/2018 | Lents et al. |
| 2018/0003109 A1 | 1/2018 | Lents et al. |
| 2018/0118335 A1 | 5/2018 | Gamble et al. |
| 2018/0127103 A1 | 5/2018 | Cantemir |
| 2018/0194483 A1 | 7/2018 | Schwoller |
| 2018/0230844 A1 | 8/2018 | Vondrell et al. |
| 2018/0251226 A1 | 9/2018 | Fenny et al. |
| 2018/0252115 A1 | 9/2018 | Himmelmann et al. |
| 2018/0265206 A1 | 9/2018 | Himmelmann |
| 2018/0266329 A1 | 9/2018 | Mackin |
| 2018/0273197 A1 | 9/2018 | Chang et al. |
| 2018/0291807 A1 | 10/2018 | Dalal |
| 2018/0319483 A1 | 11/2018 | Mayer et al. |
| 2018/0339786 A1 | 11/2018 | Thomassin et al. |
| 2018/0346111 A1 | 12/2018 | Karem et al. |
| 2018/0346139 A1* | 12/2018 | Ferran .................... B64D 31/06 |
| 2018/0354635 A1* | 12/2018 | Wagner .................... F02C 6/206 |
| 2019/0002115 A1 | 1/2019 | Miller et al. |

FOREIGN PATENT DOCUMENTS

| | | |
|---|---|---|
| BR | PI0622106 A2 | 12/2011 |
| BR | PI1104839 A2 | 11/2012 |
| EP | 2226487 A2 | 9/2010 |
| EP | 2332235 A2 | 6/2011 |
| EP | 2478608 A2 | 7/2012 |
| EP | 2238362 B1 | 3/2015 |
| EP | 3292041 A1 | 3/2018 |
| EP | 3327526 A1 | 5/2018 |
| EP | 3327527 A1 | 5/2018 |
| EP | 3350895 A1 | 7/2018 |
| EP | 3405654 A1 | 11/2018 |
| EP | 3423354 A1 | 1/2019 |
| JP | 2006231974 A | 9/2006 |
| JP | 2006270778 A | 10/2006 |
| JP | 2006290187 A | 10/2006 |
| JP | 2007137423 A | 6/2007 |
| JP | 4215012 B2 | 1/2009 |
| JP | 2009534928 A | 9/2009 |
| JP | 2011516334 A | 5/2011 |
| JP | 4973256 B2 | 7/2012 |
| JP | 2013193533 A | 9/2013 |
| JP | 5415400 B2 | 2/2014 |
| JP | 2014076771 A | 5/2014 |
| JP | 2014159255 A | 9/2014 |
| JP | 2015077089 A | 4/2015 |
| JP | 2015077091 A | 4/2015 |
| JP | 2015137092 A | 7/2015 |
| JP | 5867219 B2 | 2/2016 |
| JP | 2017074804 A | 4/2017 |
| JP | 2017150665 A | 8/2017 |
| JP | 6199496 B2 | 9/2017 |
| JP | 2017165131 A | 9/2017 |
| JP | 6213494 B2 | 10/2017 |
| JP | 2017534514 A | 11/2017 |
| JP | 6376042 B2 | 8/2018 |
| JP | 6397447 B2 | 9/2018 |
| JP | 6430885 B2 | 11/2018 |
| JP | 6433492 B2 | 12/2018 |
| KR | 20070039699 A | 4/2007 |
| KR | 20080086714 A | 9/2008 |
| KR | 20080005377 U | 11/2008 |
| KR | 20090110373 A | 10/2009 |
| KR | 20110032973 A | 3/2011 |
| KR | 20110087661 A | 8/2011 |
| KR | 20120140229 A | 12/2012 |
| KR | 20130006379 A | 1/2013 |
| KR | 101277645 B1 | 6/2013 |
| KR | 20130142491 A | 12/2013 |
| KR | 101438289 B1 | 9/2014 |
| KR | 101572184 B1 | 11/2015 |
| KR | 101659783 B1 | 9/2016 |
| KR | 20160143599 A | 12/2016 |
| KR | 20170004299 A | 1/2017 |
| KR | 101713800 B1 | 3/2017 |
| KR | 101797011 B1 | 11/2017 |
| WO | 2007086213 A1 | 8/2007 |
| WO | 2011005066 A2 | 1/2011 |
| WO | 2011107718 A1 | 9/2011 |
| WO | 2011144188 A1 | 11/2011 |
| WO | 2014108125 A1 | 7/2014 |
| WO | 2014134506 A1 | 9/2014 |
| WO | 2015107368 A1 | 7/2015 |
| WO | 2015145036 A1 | 10/2015 |
| WO | 2016074600 A1 | 5/2016 |
| WO | 2017114643 A1 | 7/2017 |
| WO | 2018044757 A1 | 3/2018 |
| WO | 2018106137 A2 | 6/2018 |
| WO | 2018191769 A1 | 10/2018 |
| WO | 2018211227 A1 | 11/2018 |

* cited by examiner

TORQUE BALANCING FOR HYBRID ELECTRIC PROPULSION SYSTEMS AND AIRCRAFT UTILIZING HYBRID ELECTRIC PROPULSION SYSTEMS

CROSS-REFERENCE TO RELATED APPLICATION

This application claims priority to and the benefit of U.S. Provisional Patent Application Ser. No. 62/812,657, filed Mar. 1, 2019, the contents thereof being incorporated herein by reference in their entirety.

BACKGROUND

1. Field

This disclosure relates to aircraft and engines therefor, and more particularly to hybrid electric aircraft engines.

2. Description of Related Art

Aircraft engines vary in efficiency and function over a plurality of parameters, such as thrust requirements, air temperature, air speed, altitude, and the like. Aircraft require the most thrust at takeoff, wherein the demand for engine power is the heaviest. However, during the remainder of the mission, the aircraft engines often do not require as much thrust as during takeoff. The size and weight of the engines allows them to produce the power needed for takeoff, however after take-off the engines are in effect over-sized for the relatively low power required to produce thrust for cruising in level flight.

Such conventional methods and systems have generally been considered satisfactory for their intended purpose. However, there is still a need in the art for improved aircraft engines. The present disclosure provides a solution for this need.

SUMMARY

A hybrid electric engine control module (ECU) configured to be operatively connected to a hybrid electric aircraft powerplant having a heat engine system and an electric motor system to control a torque output from each of the heat engine system and the electric motor system. The ECU can be configured to receive a torque command and split output power between the electric motor system and the heat engine system. Additionally and/or alternatively, the ECU can be configured to balance a total torque against a second total torque of a second aircraft powerplant.

The ECU can include a torque splitting module configured to receive a total torque value, and determine a torque split of the total torque value between the electric motor system and the heat engine system. The torque splitting module can be configured to control the electric motor system and the heat engine system to produce the total torque value in accordance with the determined torque split.

The ECU can include a total torque module configured to receive one or more input values including at least a power lever setting, determine the total torque value as a function of the one or more input values, and output the total torque value to the torque splitting module. The one or more input values can further include at least one of an altitude, a total temperature, a condition lever setting, and/or the second total torque of the second aircraft powerplant.

In certain embodiments, the total torque module can be configured to determine a total torque value using a locally stored torque map to match or approximate the second total torque of the second aircraft powerplant at a same power lever setting. The ECU can include a torque rate limit module configured to match or approximate a rate of torque change to the second aircraft powerplant to match or approximate dynamic response of the second aircraft powerplant.

The ECU can include a fuel flow control module configured to control fuel flow in the heat engine system to control torque output of the heat engine system as a function of heat engine torque value (Qh) output by the torque splitting module. In certain embodiments, the torque splitting module can be configured to output an electric motor torque value (Qe) to a motor control module (MC) of the electric motor system. The MC is configured to control an electric motor of the electric motor system as a function of the Qe.

In accordance with at least one aspect of this disclosure, a hybrid electric aircraft powerplant system can include a heat engine system configured to provide torque to an air mover, an electric motor system configured to provide torque to the air mover in addition to and/or independently of the heat engine system, and a hybrid electric engine control module (ECU) operatively connected to the heat engine system and the electric motor system to control a torque output from each of the heat engine system and the electric motor system. The ECU can be and/or include any suitable embodiment of an ECU disclosed herein (e.g., as described above). The system can include a fuel flow control module configured to receive a heat engine torque value (Qh) output by the torque splitting module and to control fuel flow in the heat engine system to control torque output of the heat engine system as a function of the Qh output by the torque splitting module. In certain embodiments, the system can include a motor control module (MC) configured to control an electric motor of the electric motor system as a function of the Qe.

In accordance with at least one aspect of this disclosure, a computer implemented hybrid electric aircraft powerplant control method can include receiving one or more power input values including at least a power lever command, determining a total torque demand based on the one or more power input values to create a total torque value, and splitting the total torque value into an electric motor torque value and heat engine torque value. The method can include controlling an electric motor system as a function of the electric motor torque value and controlling a heat engine system as a function of the heat engine torque value to cause the powerplant to meet the total torque demand.

The method can include matching or approximating the total torque value to a second total torque of a second aircraft powerplant at a same power setting. The method can include controlling torque change rate to match or approximate a second torque change rate of a second aircraft powerplant. The one or more power input values further include at least one of an altitude, a total temperature, a condition lever setting, and/or the second total torque of the second aircraft powerplant, for example.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
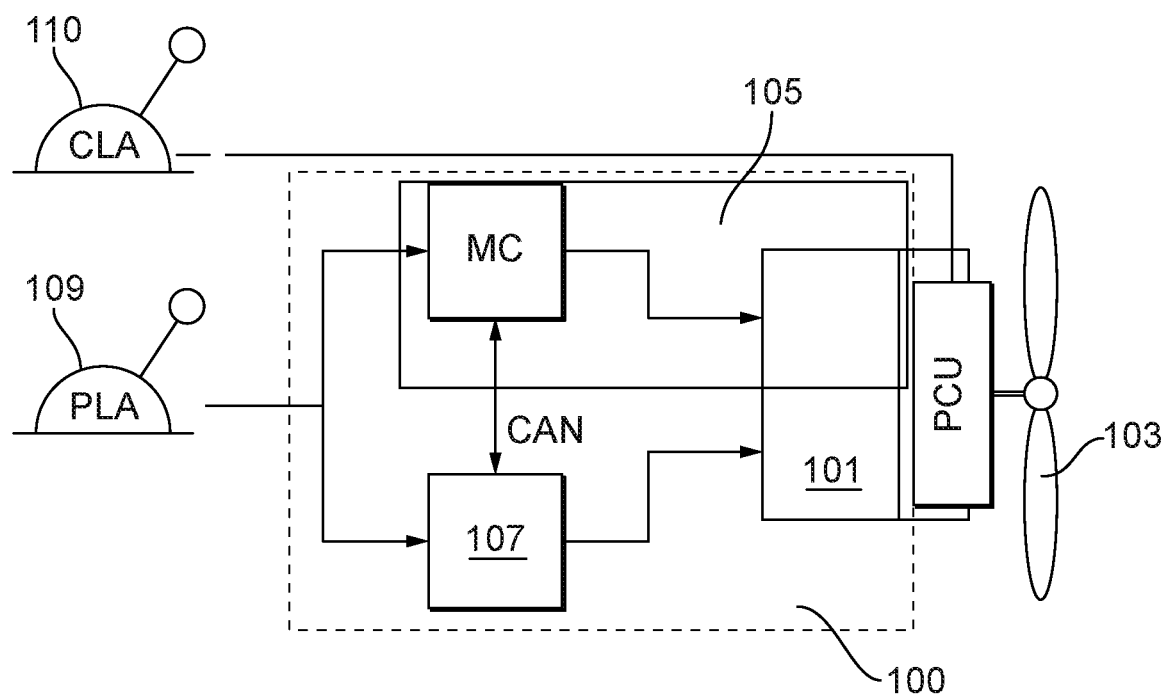
FIG. 1 is a schematic diagram of an embodiment of a hybrid electric powerplant system in accordance with this disclosure.
Figure 2:
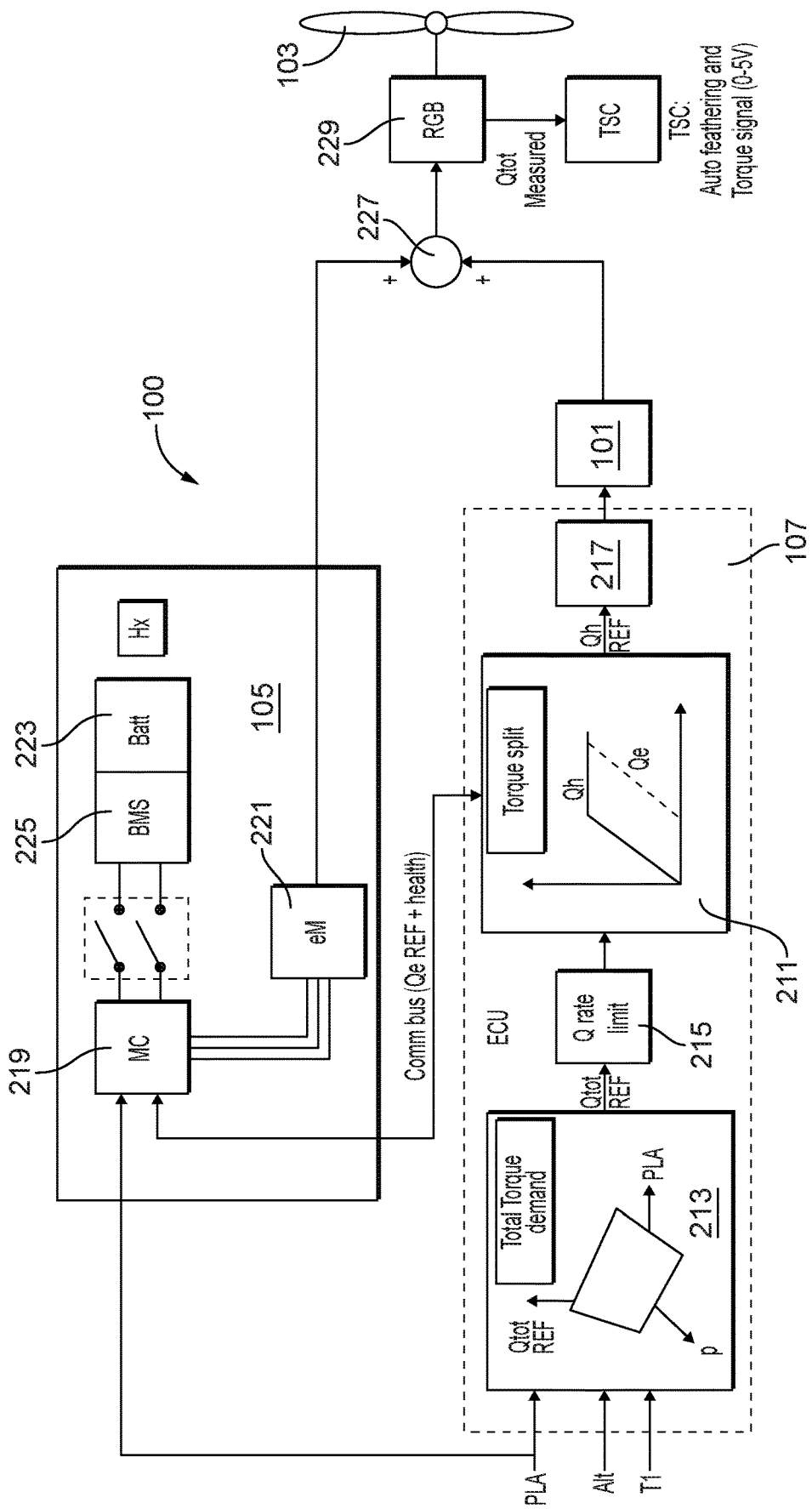
FIG. 2 is a schematic diagram of an embodiment of the hybrid electric powerplant system of FIG. 1, shown having an embodiment of an engine control module (ECU) in accordance with this disclosure.
Figure 3A:
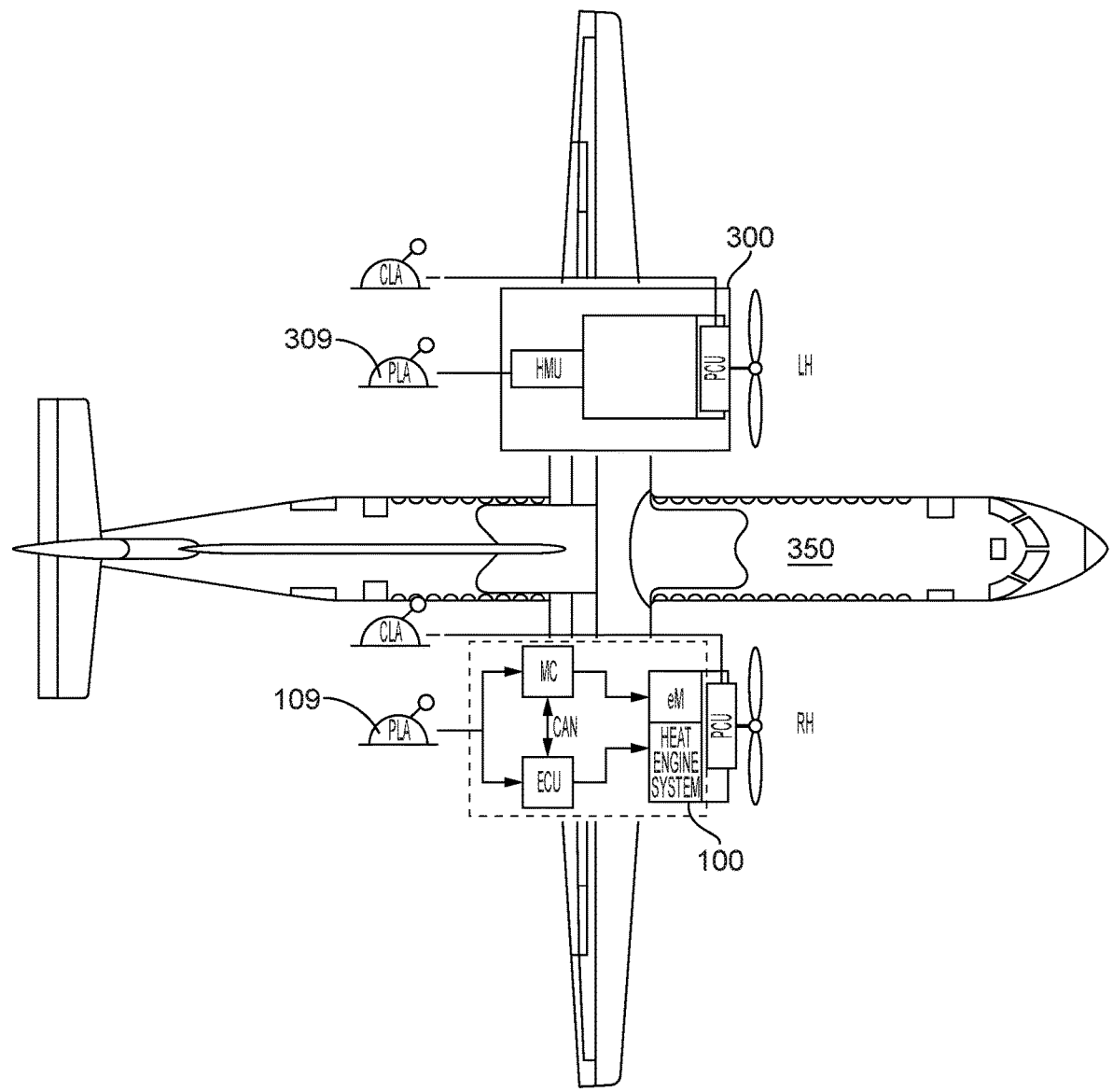
FIG. 3A is a schematic diagram of an aircraft having a hybrid electric powerplant system and a heat engine powerplant system.
Figure 3B:
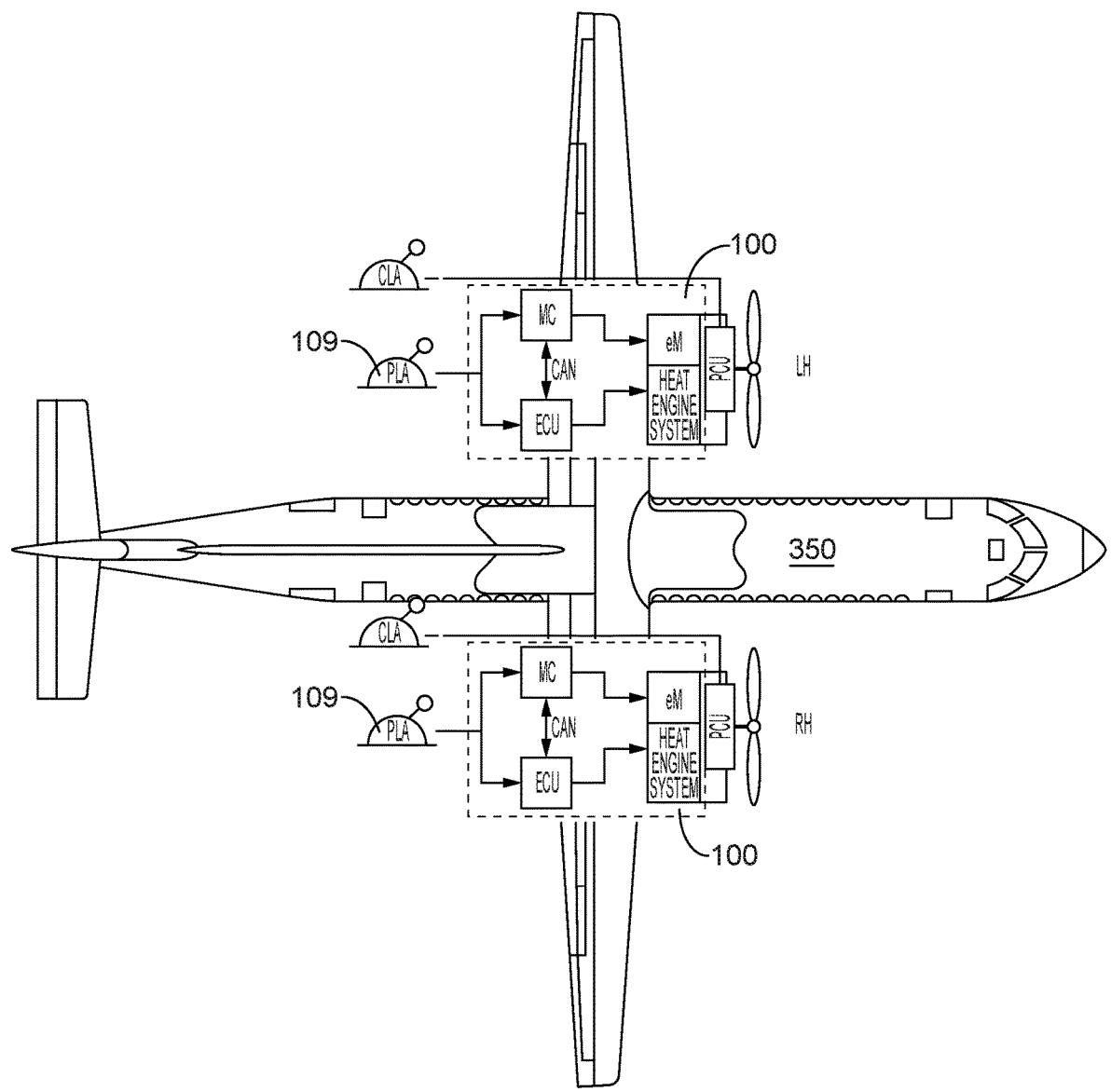
FIG. 3B is a schematic diagram of an aircraft having two hybrid electric powerplant systems.

Reference will now be made to the drawings wherein like reference numerals identify similar structural features or aspects of the subject disclosure. For purposes of explanation and illustration, and not limitation, an illustrative view of an embodiment of a powerplant system in accordance with the disclosure is shown in FIG. 1 and is designated generally by reference character 100. Other embodiments and/or aspects of this disclosure are shown in FIGS. 2-3B.

Referring to FIG. 1, a hybrid electric aircraft powerplant (HEP) system 100 can include a heat engine system 101 configured to provide torque to an air mover 103 (e.g., a propeller, fan, or any other suitable propulsion device). The heat engine of the HEP 100 can be a heat engine of any type, e.g., a gas turbine, spark ignited, diesel, rotary, or reciprocating engine of any fuel type and with any configuration. Any suitable heat engine system can include any suitable turbomachinery elements, either turbocharger, turbosupercharger, supercharger, and exhaust recovery turbo compounding, either mechanically, electrically, hydraulically or pneumatically driven, for example. An example of a rotary engine suitable for this application is disclosed in U.S. Pat. No. 10,145,291, the disclosure of which is herein incorporated by reference in its entirety.

The powerplant system 100 can also include an electric motor system 105 configured to provide torque to the air mover 103 in addition to and/or independently of the heat engine system 101. The electric motor system 105 and the heat engine system 101 can be sized and configured to produce any amount of total horsepower (e.g., 2000 horsepower total, 1000 horsepower each). The electric motor system 105 can include any suitable components as appreciated by those having ordinary skill in the art in view of this disclosure (e.g., an electric motor, an electrical supply subsystem including a battery and a battery management system).

The system 100 can include a hybrid electric engine control module (ECU) 107 operatively connected to the heat engine system 101 and the electric motor system 105 to control a torque output from each of the heat engine system 101 and the electric motor system 105. The ECU 107 can be and/or include any suitable embodiment of an ECU disclosed herein. For example, the ECU 107 can be configured to receive a torque command (e.g., a power lever angle from a power lever (PLA) 109 and/or other module) and split output power between the electric motor system 105 and the heat engine system 101. Additionally and/or alternatively, the ECU 107 can be configured to balance a total torque against a second total torque of a second aircraft powerplant 300 (e.g., as shown in FIG. 3A). The ECU 107 can additionally and/or alternatively be configured to receive any suitable sensor measurements or status information (e.g., rotor speed, temperature, and pressure at various engine stations, battery state of charge, etc.) for processing the splitting of output power. In certain embodiments, the torque split can be an adaptive split that changes in real-time as a function of one or more parameters (e.g., battery state of charge, torque command, sensor information, etc.).

In certain embodiments, the torque splitting logic may use parameters that are not directly measured and may need to be synthesized in some way (e.g. temperature or pressure at various engine stations). In certain embodiments, the torque split calculation may account for various operational constraints of the heat engine system, electrical machinery, and/or energy storage, or example.

Referring additionally to FIG. 2, the ECU 107 can include a torque splitting module 211 configured to receive a total torque value (e.g., Qtot as shown in FIG. 2 from a total torque module 213 or directly from the PLA 109 based on a setting of the PLA 109, for example). The ECU can be configured to determine a torque split of the total torque value between the electric motor system 105 and the heat engine system 101. The torque splitting module 211 can be configured to control (e.g., directly or indirectly) the electric motor system 105 and the heat engine system 101 to produce the total torque value in accordance with the determined torque split (e.g., while meeting transient and steady-state operational constraints for the heat engine, electrical motor, and battery subsystem).

In certain embodiments, the torque splitting module 211 can be configured to determine the torque split as a function of stored correlation data. In certain embodiments, for a given total torque value, lookup table or other suitable data can be used to output a correlated split between heat engine torque value (Qh) and electric motor torque value (Qe), which values ultimate control the output of the respective engine systems. For example, during takeoff, the PLA 109 may be set to a maximum power setting (e.g., 2000 horse, and the torque splitting module 211 can output a maximum Qh and a maximum Qe (e.g., 1000 horsepower from the electric motor system 105 and 1000 horsepower from the heat engine system 101). In certain embodiments, for PLA settings less than maximum power, the torque splitting module 211 can output a smaller Qe (e.g., 500 electric horsepower) and maintain a maximum Qh (e.g., 1000 horsepower). In certain embodiments, at PLA settings where the demanded total horsepower is equal to or less than a maximum Qh (e.g., less than or equal to 1000 horsepower), the torque splitting module 211 can be configured to output a Qe value of zero, thereby causing the heat engine system 101 to produce all required power which can conserve battery for situations where greater than maximum Qh is required (e.g., climb, go around).

In certain embodiments, the electric motor system 105 or the heat engine system 101 may not be able to provide a normal share of power in accordance with the torque split, e.g., due to reaching an operational limit (e.g., such as a temperature or pressure limit). For example, a torque split in cruise may be commanding full power from the heat engine system 101 (e.g., 1000 horsepower from heat engine) and less or no power from the electric motor system (e.g., 0 horsepower), but due to transient maneuver or condition, the power output of the heat engine system 101 is briefly limited (e.g., for about 1 minute or less) either by the system or by the condition (e.g., heat engine system horsepower drops to 950 HP). The ECU 107 can determine that total commanded torque is not available under the existing torque split and the torque splitting module can cause the electric motor system 105 to make up for the transient loss in horsepower from the heat engine system 101 (e.g., by providing 50 horsepower from the electric motor system 105) thereby maintaining the commanded total torque value. The reverse scenario can also be employed in certain embodiments where the heat engine system 101 can compensate for the electric motor system 105.

In certain embodiments, the torque splitting module 211 can additionally or alternatively be configured to split torque as a function of a manual input from a pilot. For example, a manual input lever for selecting an amount of electric power to be utilized can be used by a pilot. Any suitable manual control is contemplated herein.

In certain embodiments, the ECU 107 can include a total torque module 213 configured to receive one or more input values including at least a power lever setting, e.g., from the PLA 109. The total torque module 213 can be configured to determine the total torque value (Qtot) as a function of the one or more input values and output the total torque value to the torque splitting module 211. The one or more input values can further include at least one of an altitude, a total temperature, air density, a condition lever (CLA) 110 setting, and/or the second total torque of the second aircraft powerplant. Any other suitable input values for determining total torque is contemplated herein.

In certain embodiments, referring additionally to FIG. 3A, the hybrid electric powerplant system 100 can be utilized on a multiengine aircraft 350 (e.g., a retrofit Bombardier Dash-8). In certain embodiments, the aircraft 350 may utilize a traditional powerplant (e.g., a turbomachine). The total torque module 213 can be configured to determine a total torque value using a locally stored torque map (e.g., as shown) to match or approximate the second total torque of the second aircraft powerplant 300 at a same power lever setting. In certain embodiments, an actual second total torque value can be provided to the total torque module 213 (e.g., from a torque sensor or other control unit) on the second powerplant 300 such that the actual second torque can be used by the total torque module 213 to determine the total torque value Qtot. Any other suitable data from any other suitable source can be utilized to allow the total torque module 213 to match or approximate the total torque of the second aircraft powerplant to reduce or eliminate asymmetric thrust.

In certain embodiments, the ECU 107 can include a torque rate limit module 215 configured to match or approximate a rate of torque change to the second aircraft powerplant 300 to match or approximate dynamic response of the second aircraft powerplant 300. The torque rate limit module 215 can limit torque increase and/or decrease as a function of any suitable data and/or inputs (e.g., based on the one or more input values and stored data such as a look up table). In embodiments where the hybrid electric powerplant system 100 is used in a multiengine aircraft that also has a second powerplant 300 that is a traditional powerplant (e.g., a turbomachine), the second powerplant may respond slower to PLA 309 setting changes than the hybrid electric aircraft powerplant system 100 responds to PLA 109 setting changes. Since the PLA 109 and the PLA 309 can be disposed together and operated simultaneously as appreciated by those having ordinary skill in the art, to avoid dynamic mismatch when changing the settings of PLA 109 and PLA 309 together, the torque rate limit module 215 can control the time of increase or decrease of the total torque value that is provided to the torque splitting module 211 when there is a change in total torque value output by the total torque module 213. In certain embodiments, the torque rate limit module 215 can receive the PLA setting and rate-limit the PLA setting change into the total torque module 213. Any other suitable way of rate limiting is contemplated herein.

The ECU 107 can include a fuel flow control module 217 configured to control fuel flow in the heat engine system 101 to control torque output of the heat engine system 101 as a function of heat engine torque value (Qh) output by the torque splitting module 211. In certain embodiments, the torque splitting module 211 can be configured to output an electric motor torque value (Qe) to a motor control module (MC) 219 of the electric motor system 105. The MC can be configured to control an electric motor 221 of the electric motor system 105 as a function of the Qe. While the MC 219 is shown as part of the electric motor system 105, it is contemplated that the motor control module 219 can be at least partially integrated with the ECU 107 or be in any other suitable location. In certain embodiments, the fuel flow control module 217 can be separate from the ECU 107 (e.g., contained within the heat engine system 101).

Embodiments of a HEP disclosed herein are applicable to any suitable propulsion system distribution (e.g., single engine, multiengine). For example, a single engine aircraft can include a single HEP 100. While certain embodiments shown, e.g., as in FIG. 3A, show a single HEP 100 and a single traditional powerplant 300, it is contemplated that more than two powerplants can be used on an aircraft. It is also contemplated that both powerplants in a dual powerplant system (e.g., as shown in FIG. 3B) can be a HEP, e.g., HEP 100 as disclosed herein. Any suitable number (e.g., all) of powerplants in a system having a plurality of powerplants can be a HEP, e.g., HEP 100 as disclosed herein. One or multiple engines can be the same HEP or a different HEP or different full combustion or different full electric, or any combinations thereof. Any suitable control scheme for a single or multi HEP system is contemplated herein (e.g., a power setting map), e.g., similar to and/or the same as disclosed above.

Certain embodiments may provide a recharge function which may require coordination of the ECU 107, electric motor controller MC and the battery management system BMS. In certain embodiments, recharge can be done at any point where power demand is below 100% heat engine power, for example. In certain embodiments, the heat engine can be oversized to provide recharge capability at cruise, for example. In certain embodiments, aircraft speed can be reduced slighted (e.g., about 10 kts, about 10% power, or any suitable amount reduction) so the battery can be recharged without the engine being oversized by flying slower and using the freed power to recharge. Regeneration can also be implemented during certain portions of the descent flight leg, for example. Regeneration during descent can allow downsizing of the battery without loss of mission fuel burn reduction due to heat engine recharge, which burns fuel.

Certain embodiments allow torque splitting to match one or more other aircraft engines in takeoff and climb operations, and throttling back of heat engine (e.g., combustion) power may only occur at level or descending flight conditions or slower climb rate. Embodiments can manage the electric energy to climb up to altitude. The BMS can know how much energy is left and monitor the storage/discharge. Embodiments can measure remaining battery, make calculations on impact to flight, and adjust power output of the electric motor system accordingly. Any suitable sensors, sources, and data calculation to provide this information is contemplated herein (e.g., one or more sensors connected to the ECU 107 and/or BMS 225).

Embodiments can calculate and display the maximum altitude, or the maximum climb rate that can be achieved with current energy storage (e.g., based on a fixed correlation, or based on additionally on one or more flight variables, e.g., as density altitude, selected airspeed, or any other suitable factors). Certain embodiments can regenerate electricity in any suitable manner (e.g., by windmilling the propeller and/or by recharge in cruise if the heat engine is sized to be large enough to both cruise at a desired speed and provide enough excess energy to charge the battery). In certain embodiments, a pilot may have the option to reduce airspeed and use excess heat engine power to charge the battery. In certain embodiments, the ECU can command recharge of the battery in at least one portion of flight when excess power is available. The at least one portion of flight can include at least one of descent, low speed cruise, slow climb, or higher altitude cruise, for example. In certain embodiments, the ECU can command regenerating the battery with windmilling during descent or partial descent as a function of descent rate from a pilot command, flight control command, or ECU calculated rate of descent based on any other suitable parameter that the ECU can use as an input.

Any module disclosed herein can include any suitable hardware (e.g., circuitry, microprocessor, etc.) and/or software (e.g., any suitable computer code) configured to perform one or more disclosed functions of the respective module. Also, any module disclosed herein can be at least partially commonly hosted and/or integral with or at least partially separate from any other module disclosed herein as appreciated by those having ordinary skill in the art in view of this disclosure. For example, embodiments can include a separate torque split module that implements the torque split and a separate engine control module that controls the thermal engine. In certain embodiments, the can be hosted together in any suitable manner (e.g., on the same hardware and/or software).

The electric motor system 105 can include any suitable components (e.g., electric motor 221, a battery 223, a battery management system 225), and can be configured to supply any suitable type of power supply (e.g., 3 phase as shown). The heat engine system 101 can include any suitable type of heat engine. The powerplant system 100 can include a combining gear box 227 configured to combine the outputs of the electric motor system 105 and the heat engine system 101 to combine torque to the air mover 103. As appreciated by those having ordinary skill in the art, any other suitable components for the hybrid power plant system 100 is contemplated herein (e.g., a reduction gear box 229, a propeller control unit, a propeller).

While this disclosure refers to certain levers (PLA, CLA, manual lever), the term lever is not limited to a physical lever, and includes any suitable control structure. For example, certain embodiments of levers can include a dial, a digital interface, or any other suitable control for use by a pilot in commanding inputs.

In accordance with at least one aspect of this disclosure, a computer implemented hybrid electric aircraft powerplant control method can include receiving one or more power input values including at least a power lever command, determining a total torque demand based on the one or more power input values to create a total torque value, and splitting the total torque value into an electric motor torque value and heat engine torque value. The method can include controlling an electric motor system as a function of the electric motor torque value and controlling a heat engine system as a function of the heat engine torque value to cause the powerplant to meet the total torque demand.

The method can include matching or approximating the total torque value to a second total torque of a second aircraft powerplant at a same power setting. The method can include controlling torque change rate to match or approximate a second torque change rate of a second aircraft powerplant. The one or more power input values further include at least one of an altitude, a total temperature, a condition lever setting, and/or the second total torque of the second aircraft powerplant, for example. Any other suitable methods and/or portions thereof are contemplated herein.

In accordance with at least one aspect of this disclosure, an aircraft 350 can have a hybrid-electric powerplant system as disclosed above in place of a traditional powerplant, and a second powerplant that is a traditional powerplant. Embodiments can include propulsion delivered by a propeller driven by both an electric motor system and a heat engine system. Certain embodiments include 50/50 power split between the electric motor and heat engine power lanes (such that each engine/motor provides the same maximum power). Any other power split is contemplated herein. The electric motor control module can selectively provide energy from the battery to the electric motor. The battery can be located in the aircraft cabin, for example.

In embodiments, the battery, the BMS system and motor control module can be located in the cabin. A high voltage (e.g., about 1 kV) AC distribution system can transmit electrical power from the motor control module to the electric motor that is mechanically parallel with the heat engine. The propeller condition lever (CLA) can control the propeller control unit (PCU) as appreciated by those having ordinary skill in the art. In certain embodiments, the CLA command may be optionally read by the ECU. The ECU can be the master Power Management System (PMS) and can control the total power request and limits as well as torque split between the heat engine and the electric motor.

Embodiments of an ECU can calculate the total torque demand for the HEP based on the PLA power demand and flight operating conditions to mimic a traditional engine (e.g., turbomachine) steady response and transient torque response. The ECU can then calculate the torque split between the heat engine and the electric motor. The torque split may include electric compensation during a transient or limited power condition (e.g., temperature, boost compressor running line) of the heat engine. The ECU can then send the electric torque command to the electric motor control module via any suitable communication pathway (e.g., a digital communication link). The motor control module then command proper AC voltage and current to the electric motor. The raw PLA setting input can also be read by the motor control module for health assessment of the ECU and for direct control based on the PLA settings in certain degraded operational modes (e.g., wherein ECU is not functional).

Embodiments can balance torque between two powerplants on aircraft (e.g., a combination of one or more HEP and one or more traditional engines) such that either the HEP matches sensed torque output of a traditional engine, or calculates what torque setting should be to match or approximate the traditional engine torque (e.g., based on throttle inputs, altitude, etc.). Embodiments can balance torque between two or more HEP powerplants (e.g., as shown in FIG. 3B), or any other suitable combination of at least one HEP powerplant and at least one of any other type of powerplant (e.g., a turbomachine, piston, hybrid, full electric). Embodiments include a torque rate limiter for when power lever is moved since the HEP system achieves torque faster than a traditional engine (e.g., a turbomachine) to slow torque changes to match or approximate torque changes of the traditional engine. Embodiments as disclosed herein provide fuel use reduction among other benefits.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid electric engine control module (ECU) configured to be operatively connected to a hybrid electric aircraft powerplant having a heat engine system and an electric motor system to control a torque output from each of the heat engine system and the electric motor system, the heat engine system and the electric motor system drivingly engaged to a first air mover, the ECU being configured to:
receive a torque command and split output power between the electric motor system and the heat engine system;
the ECU further comprising a torque splitting module configured to:
receive a total torque value;
receive a second total torque value, the second total torque value generated by a second aircraft powerplant driving a second air mover different than the first air mover, the first air mover being disengaged from the second aircraft powerplant, the second air mover being disengaged from the hybrid electric aircraft powerplant, the first air mover having a thrust requirement corresponding to that of the second air mover, the first air mover engaged solely by the hybrid electric aircraft powerplant, the second air mover engaged solely by the second aircraft powerplant;
determine a torque split of the total torque value between the electric motor system and the heat engine system, including varying both of a first torque generated by the heat engine system and a second torque generated by the electric motor system to achieve the torque split and to output the total torque value; and
control the electric motor system and the heat engine system to produce the total torque value in accordance with the determined torque split to match or approximate the second total torque value generated by the second aircraft powerplant.

2. The ECU of claim 1, further comprising a total torque module configured to:
receive one or more input values including at least a power lever setting;
determine the total torque value as a function of the one or more input values; and
output the total torque value to the torque splitting module.

3. The ECU of claim 2, wherein the one or more input values further include at least one of an altitude, a total temperature, a condition lever setting, and/or the second total torque of the second aircraft powerplant.

4. The ECU of claim 2, wherein the total torque module is configured to determine the total torque value using a locally stored torque map to match or approximate the second total torque of the second aircraft powerplant at a same power lever setting.

5. The ECU of claim 2, further comprising a torque rate limit module configured to match or approximate a rate of torque change to the second aircraft powerplant to match or approximate dynamic response of the second aircraft powerplant.

6. The ECU of claim 1, comprising a fuel flow control module configured to control fuel flow in the heat engine system to control torque output of the heat engine system as a function of a heat engine torque value (Qh) output by the torque splitting module.

7. The ECU of claim 6, wherein the torque splitting module is configured to output an electric motor torque value (Qe) to a motor control module (MC) of the electric motor system, wherein the MC is configured to control an electric motor of the electric motor system as a function of the Qe.

8. A hybrid electric aircraft powerplant system, comprising:
a heat engine system configured to provide a first torque to a first air mover;
an electric motor system configured to provide a second torque to the first air mover in addition to and/or independently of the heat engine system; and
a hybrid electric engine control module (ECU) operatively connected to the heat engine system and the electric motor system to control a torque output from each of the heat engine system and the electric motor system, wherein the ECU is configured to receive a torque command and split output power between the electric motor system and the heat engine system, wherein the ECU includes a torque splitting module configured to:
receive a total torque value;
receive a second total torque value, the second total torque value generated by a second aircraft engine driving a second air mover different than the first air mover, the first air mover being disengaged from the second aircraft engine, the second air mover being disengaged from the hybrid electric aircraft powerplant system, the first air mover having a thrust requirement corresponding to that of the second air mover, the first air mover engaged solely by the hybrid electric aircraft powerplant, the second air mover engaged solely by the second aircraft engine; and
determine a torque split of the total torque value between the electric motor system and the heat engine system, including varying both of the first torque generated by the heat engine system and the second torque generated by the electric motor system to achieve the torque split and to output the total torque value; and
control the electric motor system and the heat engine system to produce the total torque value in accordance with the determined torque split to match or approximate the second total torque value generated by the second aircraft engine.

9. The hybrid electric aircraft powerplant system of claim 8, wherein the ECU further comprises a total torque module configured to:
receive one or more input values including at least a power lever setting;
determine the total torque value as a function of the one or more input values; and
output the total torque value to the torque splitting module.

10. The hybrid electric aircraft powerplant system of claim 9, wherein the one or more input values further include at least one of an altitude, a total temperature, a condition lever setting, and/or the second total torque of the second aircraft powerplant.

11. The hybrid electric aircraft powerplant system of claim 9, wherein the total torque module is configured to determine the total torque value using a locally stored torque map to match or approximate the second total torque of the second aircraft powerplant at a same power lever setting.

12. The hybrid electric aircraft powerplant system of claim 9, wherein the ECU further comprises a torque rate limit module configured to match or approximate a rate of torque change to the second aircraft powerplant to match or approximate dynamic response of the second aircraft powerplant.

13. The hybrid electric aircraft powerplant system of claim 8, further comprising a fuel flow control module configured to receive a heat engine torque value (Qh) output by the torque splitting module and to control fuel flow in the heat engine system to control torque output of the heat engine system as a function of the Qh output by the torque splitting module.

14. The hybrid electric aircraft powerplant system of claim 13, wherein the torque splitting module is configured to output an electric motor torque value (Qc) to a motor control module (MC) of the electric motor system, wherein the MC is configured to control an electric motor of the electric motor system as a function of the Qe.

15. A computer implemented hybrid electric aircraft powerplant control method for a hybrid electric aircraft powerplant drivingly engaged to a first air mover, the method comprising:

receiving one or more power input values including at least a power lever command;

determining a total torque demand based on the one or more power input values to create a total torque value and receiving a second total torque value generated by a second aircraft powerplant drivingly engaging a second air mover different than the first air mover, the first air mover being disengaged from the second aircraft powerplant, the second air mover being disengaged from the hybrid electric aircraft powerplant, the first air mover having a thrust requirement corresponding to that of the second air mover, the first air mover engaged solely by the hybrid electric aircraft powerplant, the second air mover engaged solely by the second aircraft powerplant;

splitting the total torque value into an electric motor torque value and a heat engine torque value, including varying both of an electric motor torque and a heat engine torque to achieve a desired torque split and to output the total torque; and controlling an electric motor system as a function of the electric motor torque value and controlling a heat engine system as a function of the heat engine torque value to cause the powerplant to meet the total torque demand, wherein the one or more power input values includes at least a second total torque of the second aircraft powerplant.

16. The method of claim 15, further comprising matching or approximating the total torque value to the second total torque of the second aircraft powerplant at a same power setting.

17. The method of claim 15, further comprising controlling a torque change rate to match or approximate a second torque change rate of the second aircraft powerplant.

18. The method of claim 15, wherein the one or more power input values further include at least one of an altitude, a total temperature, and/or a condition lever setting.

19. The method of claim 15, comprising controlling fuel flow in the heat engine system to control torque output of the heat engine system as a function of the heat engine torque value (Qh) output by a torque splitting module, wherein the torque splitting module is configured to output the electric motor torque value (Qe) to a motor control module (MC) of the electric motor system, wherein the MC is configured to control an electric motor of the electric motor system as a function of the Qe.

\* \* \* \* \*